United States Patent

[11] 3,632,183

[72] Inventors: Kenneth A. Haines
Hockessin, Del.;
Bernard P. Hildebrand, Kennewick, Wash.
[21] Appl. No. 744,732
[22] Filed July 15, 1968
[45] Patented Jan. 4, 1972
[73] Assignee Holotron Corporation
Wilmington, Del.

[54] HOLOGRAPHIC IMAGING BY SIMULTANEOUS SOURCE AND RECEIVER SCANNING
25 Claims, 13 Drawing Figs.

[52] U.S. Cl. ................................................. 350/3.5, 178/6.5
[51] Int. Cl. ................................................. G02b 27/22
[50] Field of Search .......................................... 350/3.5

[56] References Cited
UNITED STATES PATENTS
3,461,420 8/1969 Silverman .................... 350/3.5 X OTHER REFERENCES
Kock, Proc. Of IEEE, Vol. 56, No. 2, pp. 238–239 (2/1968).

Primary Examiner—David Schonberg
Assistant Examiner—Robert L. Sherman
Attorney—Woodcock, Washburn, Kurtz & Machiewicz ABSTRACT: Both a radiation source and a radiation receiver are scanned relative to an object scene under investigation for obtaining holographic information as to the scene. By relating the relative movement of the source and receiver in a predetermined manner, various characteristics of the holographically reconstructed image of the object scene may be controlled. In one embodiment, the source and receiver are locked together and scanned relative to an object scene during the construction of a hologram capable of reconstructing an image of the object scene with twice the resolution that is obtained by ordinary holographic techniques. Apparatus for carrying out this improved scanning technique is disclosed in the embodiment of ultrasonic holography wherein a hologram is constructed directly on photographic film or displayed on a cathode ray oscilloscope.

HOLOGRAPHIC IMAGING BY SIMULTANEOUS SOURCE AND RECEIVER SCANNING

BACKGROUND OF THE INVENTION

Recent improvements in the techniques of holography are well known. As described in patent application Ser. No. 361,977, filed Apr. 23, 1964, now U.S. Pat. No. 3,506,327, two coherent radiation beams are brought together with a finite angle therebetween at a radiation detector to form an interference pattern thereon. For optical holography, the radiation is within the visible region and the detector is usually photographic film which records the interference pattern between the two light radiation beams. One light beam is modified by the object scene to be recorded and the other light beam serves as a reference beam. After exposure and development of the photographic film, it is illuminated with a light beam similar to the reference beam used in constructing the hologram. The reconstructing light beam is diffracted by the recorded interference pattern into at least one diffracted beam which carries information of the object scene for viewing. The object scene is so viewed in full three dimensions including parallax effects as if the object scene itself were being viewed.

A further recent improvement in the art of holography involves the use of compressional wave energy in the ultrasonic range and is described in patent application Ser. No. 569,914, filed Aug. 3, 1966. Two coherent ultrasonic beams are caused to interfere with each other at an ultrasonic detector illuminated with light to view in the optical domain a full three-dimensional representation of the object scene as viewed by ultrasonic energy. One ultrasonic beam is modified by the object scene and the other serves as a reference beam.

A more recent development in the art of holography involves scanning a substantially point receiver relative to an object scene over a surface where an interference pattern from two radiation beams exists. The received radiation is typically converted to an electrical signal which modulates the intensity of a point light source which is scanned over a photographic film simultaneously with scanning the receiver over its surface. Furthermore, the reference radiation beam may be eliminated and simulated electronically by a predetermined electrical wave form being mixed with the electrical signal output of the scanning receiver. After the photographic film is fully exposed and developed, images may be holographically reconstructed therefrom in the normal manner. A system of scanned receiver holography used with ultrasonic radiation is described by Preston and Kreuzer in *Applied Physics Letters*, Mar. 1, 1967, Vol. 10, No. 5, page 150.

It has also been found that instead of scanning a receiver, the object-scene-illuminating source may itself by scanned relative to an object scene over an area. A substantially point receiver remains fixed relative to the object scene. Such a technique is described more fully in copending patent application Ser. No. 662,736, filed Aug. 23, 1967. It should be noted that both the scanned receiver and the scanned source techniques produce holograms with the same characteristics as those produced by ordinary nonscanned holography.

Therefore, it is an object of this invention to devise a method of scanning in holography which allows choosing undistorted desired magnification and resolution in its image.

It is also an object of this invention to produce a scanning system which will provide improved resolution in holographically reconstructed images.

It is an additional object of this invention to produce a scanned holography technique which will reduce the area that need be scanned without reducing resolution of the reconstructed image from what it would be in ordinary holography.

SUMMARY OF THE INVENTION

These and additional objects of this invention are accomplished by a system wherein the source and receiver are simultaneously scanned in a predetermined manner relative to the object scene being recorded. According to one aspect of the invention, the source and receiver are locked together and scanned over an area, thereby producing a hologram capable of reconstructing an image with twice the resolution available from a hologram constructed in an ordinary manner with an aperture the same as the area scanned. In the alternative, only one-quarter of this area need be scanned to produce a hologram capable of reconstructing an image with resolution equal to that produced from a hologram constructed in the ordinary manner with an aperture of full area. According to another aspect of this invention, it has been discovered that the source and receiver may also have a velocity relative to each other if the components of velocity of each relative to that of the object scene are related by proportionality constants. A hologram so constructed is capable of reconstructing a laterally undistorted image of the object scene with its resolution and magnification dependent upon this proportionality constant.

For a more detailed disclosure of the invention and for further objects and advantages thereof, reference should be had to the following description taken in conjunction with the accompanying drawings.

DESCRIPTION OF THE PREFERRED EMBODIMENTS

Figure 1:
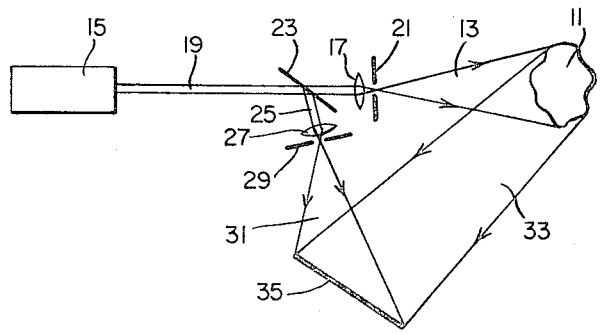
FIGS. 1 and 1A illustrate the technique of ordinary holography in the optical domain.

Referring to FIG. 1, a basic technique of optical holography will be briefly reviewed. An object scene 11 is illuminated by a coherent light beam 13 which is most easily obtained from a laser light source 15 with a lens 17 in its narrow light beam 19 and a pinhole filter 21 placed at the focal plane of the lens 17. A beam splitter 23 reflects part of the light of the beam 19 into another beam 25 in which a lens 27 and pinhole filter 29 are placed to give a good spherical wave front reference light beam 31. Light reflected from the object scene 11 in the form of an object modified beam 33 is captured by a detector such as photographic film 35. The reference beam 31 also illuminates the film 35 while intersecting with the object bearing beam 33 at a finite angle therewith and forms an interference pattern between the two beams which is recorded on the film. The object scene 11 is shown here to be of the reflective type but is it to be understood that transmittive objects may also be the subjects of a hologram.

Figure 1A:
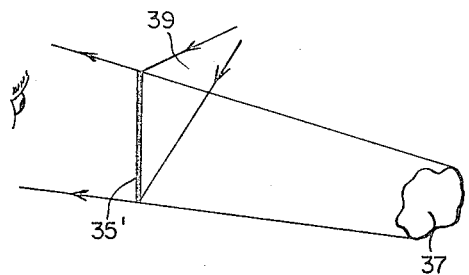

After development of the film 35, an image 37 (FIG. 1A) may be reconstructed from the hologram 35' upon illumination by a reconstructing light beam 39 which preferably has the same curvature as the reference beam 31 and further strikes the hologram 35' at the same angle at which the reference beam 31 struck the photographic film 35 during construction. The reconstructing light beam 39 is diffracted into at least one image-carrying beam. In FIG. 1A, an observer's eye is shown in a diffracted beam wherein light from an image appears to be coming from behind the hologram 35'. If the wavelength of the reconstructing light beam 39 is the same as was used in constructing the hologram and if the curvature of the light beam wave front is similar to that of the reference beam 31 and if it strikes the hologram at the same angle as the reference beam, the image 37 will be the same size and at the same position relative to the hologram as was the object scene 11 during construction thereof. As the wavelength or radius of curvature of the reconstructing light beam 39 is altered, the image 37 will be magnified or demagnified and its position relative to the hologram 35' will be changed.

Figure 2:
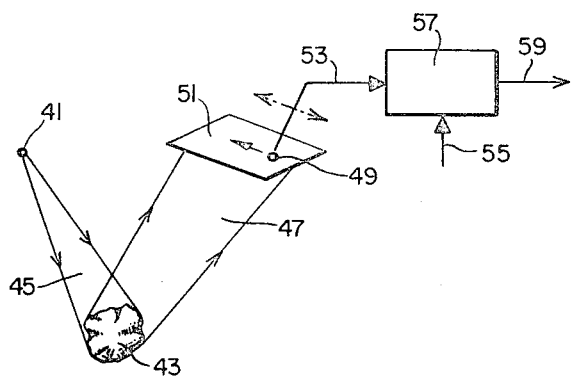
FIG. 2 schematically illustrates receiver scanning in holography.

A further development in holography is shown in FIG. 2 wherein a point radiation receiver is scanned over an area. An effective point radiation source 41 illuminates an object scene 43 with an object beam of radiation 45, which is reflected and diffracted by the object in the form of an object modified beam 47. A radiation receiver 49, such as photocell for visible light radiation, is substantially a point and scanned over a plane area 51. An electrical connection 53 carries from the receiver an electrical signal proportional to the radiation incident thereon. This electrical signal is utilized to modulate the intensity of a light source which is scanned across a photographic film to construct a permanent hologram. Although a reference beam coherent with the object beam 45 could be interfered with the object-bearing beam 47 in the scanned receiver process, it is preferable in certain circumstances, as shown in FIG. 2, to electronically simulate this reference beam. A reference signal 55 is mixed with the receiver output signal 53 in some sort of well-known electronic mixing unit 57 to produce holographic information at the output terminal 59. This holographic output signal may then modulate the intensity of a substantially point light source which is scanned across a photographic film in synchronism with the scanning of the receiver 49 to produce a permanent hologram. The hologram so constructed is capable of reconstructing an image of the object 43 as if a holographic detector such as photographic film were placed in the scanned area 51 and illuminated with the object bearing beam 47 and an appropriate reference beam.

Figure 3:
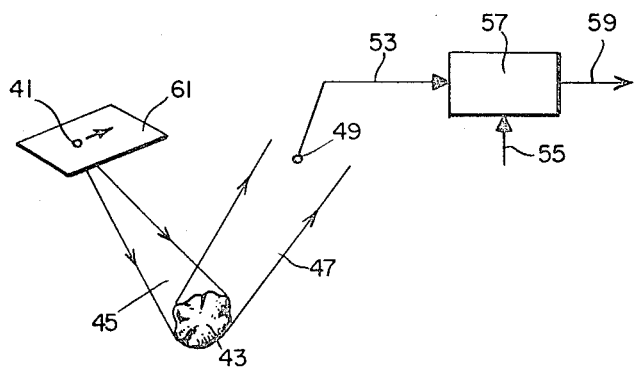
FIG. 3 schematically illustrates source scanning in holography.

In some situations it may be difficult or impractical to scan the receiver over an area and it has been found that the source 41 may be scanned over an area relative to the object 43 and the receiver 49 held constant relative to the object, as illustrated in FIG. 3. The source 41 is here scanned in some convenient manner over an area 61, with a light source modulated in intensity by the electrical signal and the output 59 scanned over a photographic film in synchronism with the scanning of the source 41. The resulting permanent hologram is capable of reconstructing an image of the object as viewed through the plane area 61 by ordinary techniques.

It will be understood that the aforementioned known techniques of holography and those of the present invention whose description is to follow do not depend on the particular wave radiation utilized. The invention is applicable to the entire spectrum of electromagnetic radiation, including visible light, microwaves, infrared, ultraviolet, X-rays radio waves, etc., and for all ranges of compressional or accustic radiation including subsonic, sonic, supersonic, ultrasonic, hypersonic, and even phonons. The fundamental requirement for producing holographic information is that the wave radiation utilized must be coherent so that a specific wavelength can be defined. When such radiation is utilized, the object modified beam and the reference beam can be mixed together to produce an interference pattern which contains holographic information capable of reconstructing the original object modified beam and therefore images of the original object.

It should be further noted that modulated wave radiation may be used to produce the object modified beam. Such wave radiation, for example, may be visible light modulated at microwave frequencies or it may be ultrasonic radiation modulated at sonic frequencies.

It should also be pointed out that the particular type of receiver or detector will depend on the particular type of wave radiation utilized. For example, in the case of visible light radiation the receiver 49 would be some photosensitive device, whereas in the case of ultrasonic wave radiation the receiver 49 would most likely be a quartz transducer. In either the receiver or source scanning technique as illustrated in FIGS. 2 and 3, the holographic information recorded is essentially the same as that recorded in the basic holographic technique as illustrated in the optical domain in FIG. 1. Although there are many advantages in the known scanning techniques of constructing a hologram, the end result is substantially the same no matter how fine the scan pattern.

Figure 4:
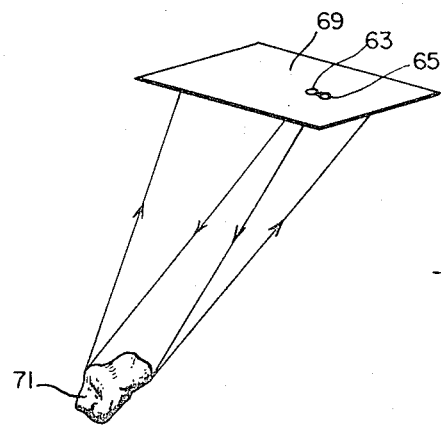
FIG. 4 illustrates one embodiment of the present invention wherein the source and receiver are simultaneously scanned while locked together.

As part of the present invention, it has been discovered that if both the source and receiver are scanned relative to the object, the resulting permanent hologram is capable of reconstructing an image of the object with desirable characteristics not available through ordinary holography and scanning techniques. Referring to FIG. 4, according to one aspect of the invention, a source 63 and receiver 65 are substantially coincident and locked together for scanning over a surface 69 relative to an object 71, the resulting hologram will reconstruct an image with twice the resolution that is available from the aforementioned techniques. The reconstructed image appears to be the object viewed through the scanned surface 69 except that it appears only one-half the distance therefrom.

Figure 6:
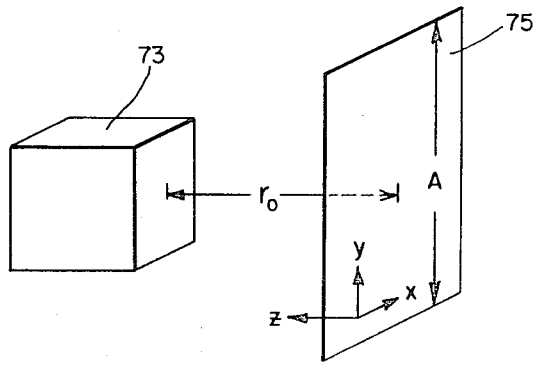
FIGS. 6 and 6A illustrate a comparison between images reconstructed according to ordinary holography and those reconstructed according to certain techniques of this invention.
Figure 6A:
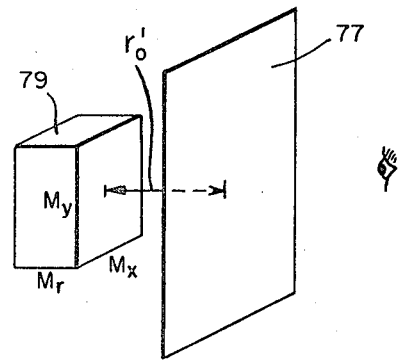

Referring to FIGS. 6 and 6A, the imaging properties of a hologram made by locking the source and receiver during scanning may be illustrated. Assume that a square block 73 is an object of a hologram located a distance $r_0$ from a scanned plane 75 having an aperture dimension A. If the area 75 is simultaneously scanned by locked source and receiver, a collimated reconstructing radiation beam incident upon a permanent hologram 77 will reconstruct an image 79 of the object 73 as shown in FIG. 6A, if the reference beam or electronic simulation thereof used in constructing this hologram was a collimated beam and of the same frequency as the reconstructing beam. The lateral magnifications $M_x$ and $M_y$ will be equal to unity and the front surface of the block will be located a distance $r_0'$ from the hologram 77 which is equal to one-half $r_0$. The magnification in the radial direction, $M_r$, is one-half. This distorted image is often of no concern, but it may be corrected by the use of standard optical systems or by appropriately enlarging (or shrinking) the hologram 77, or by a combination of both of these techniques.

For locked source and receiver scanning, it has been found that the smallest resolvable element δ of a reconstructed image parallel to the dimension A is given by the following expression:

$$\delta \cong (\lambda_1 r_0)/(2A)$$  (1) where $\lambda_1$ is the constructing radiation wavelength. This expression may be recognized as equal to one-half the resolution element size in ordinary holography. This doubling of resolution is a much desired advantage and it further may be recognized from equation (1) that, in the alternative to be able to have the same resolution as in ordinary holography, the area scanned need be only one-quarter as great.

Instead of the source and receiver being substantially coincident as illustrated in FIG. 4, they may be separated by some distance and still afford the resolution improvement advantage of locked source and receiver scanning. However, the image reconstructed will be rotated an amount dependent upon the distance between the source and receiver and the distance of the individual object elements from the scanned source and receiver. By controlling the distance between the source and receiver, therefore, the view obtained of the object scene may thus be controlled.

Figure 5:
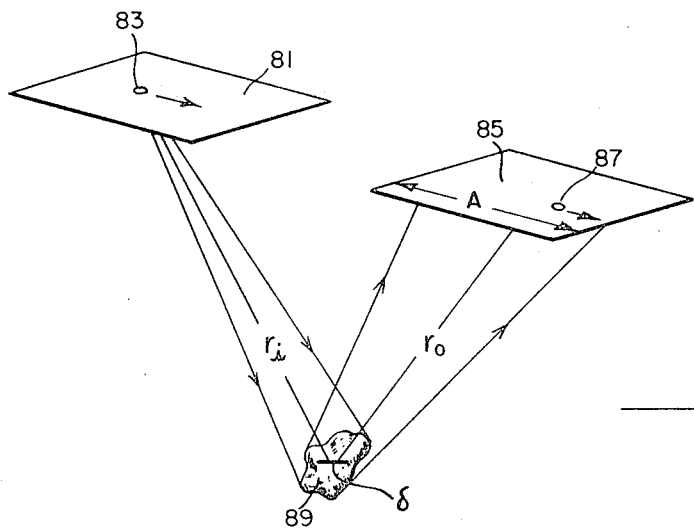
FIGS. 5 and 5A illustrate the present invention in its more general case wherein the source and receiver are simultaneously scanned relative to an object scene and over independent areas.

It will be noted that there is no relative velocity between the source and receiver during the scanning process in the embodiment of this invention hereinabove described with reference to FIG. 4. It has been found, however, that certain useful results in controlling resolution and magnification may be obtained if the source and receiver have motion relative to each other. The nature of this relative motion also controls distortion and astigmatism of the reconstructed image. Referring to FIG. 5, consider a plane 81 scanned by a source 83 and a plane 85 scanned by a receiver 87 to form a hologram of an object 89. As in all embodiments of the present invention, the object is illuminated with a diverging beam from the point source so that the point source illuminates substantially the same portions of the object from all points on the source scanned surface. In a particular embodiment, the scanned planes are parallel to each other and the velocities of the source 83 and the receiver 87 are at all times during the scanning process in the same direction or in opposite directions. With the directional limitations on the velocity of the source and receiver, it has been discovered that a good quality image will be obtained whose resolution and magnification depend upon the ratio of these velocities, which may be designated as the constant C. The smallest object element capable of being resolved may be expressed by the following:

$$\delta \sim \frac{\lambda_1}{A} \left( \frac{1}{\frac{1}{r_0} + \frac{C}{r_i}} \right) \quad (2)$$

where $\lambda_1$ is the constructing radiation wavelength,
A is the aperture of the receiver scanned plane 85 in a direction parallel to the resolution element $\delta$,
$r_i$ the distance of the source scanned plane 81 from the object, and
$r_0$ the distance of the receiver scanned plane 85 from the object 89.

It will be noted that if $C=1$ and $r_0=r_i$, the case where the velocity of the source 83 and receiver 87 are equal, we have resolution capability as described with respect to FIG. 4, and equation (2) becomes equation (1). It may also be noted from equation (2) that if either source or the receiver remains fixed relative to the object, $C=0$ and equation (2) becomes the resolution expression of ordinary holography.

Therefore, the resolution capability of a hologram constructed by simultaneous scanning of the source and receiver is dependent upon their relative velocities and may be chosen for any desired resolution between that obtained in ordinary holography and that possible by locked source and receiver scanning as described with respect to FIG. 4. Furthermore, as this relative velocity constant C is altered, so the magnification of the image is altered. The lateral magnification of the image is undistorted, but there will be unequal magnification in the radial direction according to the equation:

$$M_r = \frac{\lambda_1}{\lambda_2} \frac{1+C^2}{(1+C)^2} M_x^2 \quad (3)$$

if $r_0=r_i$, where $\lambda_2$ is the hologram-reconstructing wavelength. Such distortion is often of no concern, but it may be corrected by the use of standard optical systems or by appropriately enlarging (or shrinking) the hologram, or by a combination of these techniques.

So far, the embodiment of the present invention described with reference to FIG. 5 wherein the source and receiver are scanned relative to an object and with a relative velocity between them has been restricted to parallel plane surfaces scanned with a source and receiver always traveling in the same or opposite direction and the ratio of the source and receiver velocities at all times is the same constant C. That is, the source and receiver scan their respective surfaces in patterns that are replicas of each other. This set of conditions results in a laterally distortionless and nonastigmatic image. It may not be possible, in certain circumstances, to maintain these conditions exactly because of mechanical limitations in scanning equipment or for other reasons. For instance, the ratio of velocities of the source and receiver may be one constant in one direction of scanning and another constant in a transverse scanning direction. The lateral magnification of the resulting image will then be different in each of the two transverse scanning directions, and an astigmatic image will result in that the image will not come to focus in both directions at the same plane. Furthermore, if the ratio of velocity components is not a constant, but rather some acceleration exists, the distortion may be even greater. This distortion may be of no concern in certain circumstances, and in others it may be corrected by optical elements.

Figure 5A:
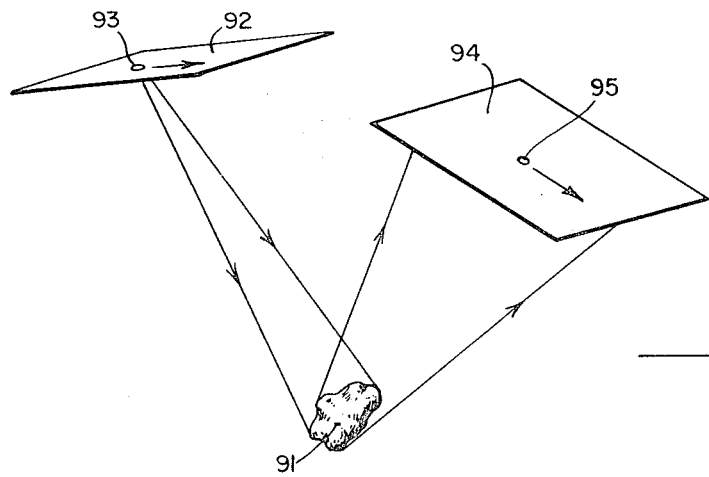

The present invention may be described in a more general manner with reference to FIG. 5A. A plane surface 92 is scanned with a source 93 and a plane surface 94 is scanned with a receiver 95 in order to construct a hologram of an object 91. As opposed to the embodiment of the invention described with reference to FIG. 5, the source and receiver scanning surfaces are not here parallel planes.

The embodiments of this invention have been described with surfaces scanned being planes surfaces, but it should be noted that the scanned surfaces may take on some other shape. For instance, if a flat hologram is constructed by scanning the receiver over a spherical surface, there will be some effect upon the image reconstructed which may be desirable or may be corrected by optical techniques if undesirable.

It should be noted that throughout the discussion pertaining to scanning, the velocities referred to are those of the source and receiver relative to the object. It is understood that in fact the source or receiver may be held fixed relative to its surroundings and the velocities are then equivalent to relative velocities obtained by moving the object and receiver or source.

Figure 7:
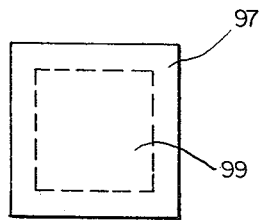
FIGS. 7, 7A, and 7B illustrate a few of the possible areas that may be simultaneously scanned by a source and receiver in carrying out the techniques of this invention.
Figure 7A:
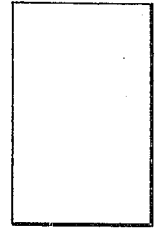
Figure 7A:
Figure 7B:
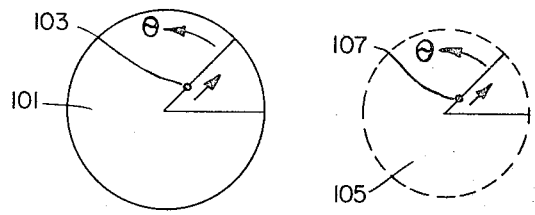

Referring to FIGS. 7, 7A and 7B, a few of the many possible areas that may be scanned by a source and receiver simultaneously are shown in plan view. In FIG. 7 a square area 97 enclosed by the solid lines is scanned by, for example, the receiver. An area 99 enclosed by the dotted lines is scanned by a source. A typical scanning situation will be one in which the source and receiver move across their respective areas with a constant velocity and taking the same amount of time to transverse each area, thereby having different velocities. That is, the scanning patterns of the source and the receiver are replicas of each other. Therefore, the ratio of velocities that is important to know in determining the characteristics of the resulting image is dependent upon the relative size of the areas scanned by the source and receiver under these limited circumstances. Square areas are shown in FIG. 7 to be superimposed upon one another and FIG. 7A shows another arrangement where the areas can be rectangular with proportional dimensions and not superimposed upon each other. It can be seen that any number of combinations exist for simultaneous source and receiver scanning.

A further possibility is to scan a circular area by a rotating source and receiver as shown in FIG. 7B. Consider an area 101 to be scanned by a receiver 103 and an area 105 to be scanned by a source 107. If the source and receiver have equal angular velocities and are synchronized to be corresponding angular positions at any instant of time, and if further the receiver 103 and source 107 have radial velocities which are related by a constant, a hologram may be formed capable of reconstructing an image without distortion. It should be noted that the particular areas chosen to be scanned will generally depend upon mechanical feasibility or desirability in scanning one type of area or another.

Figure 8:
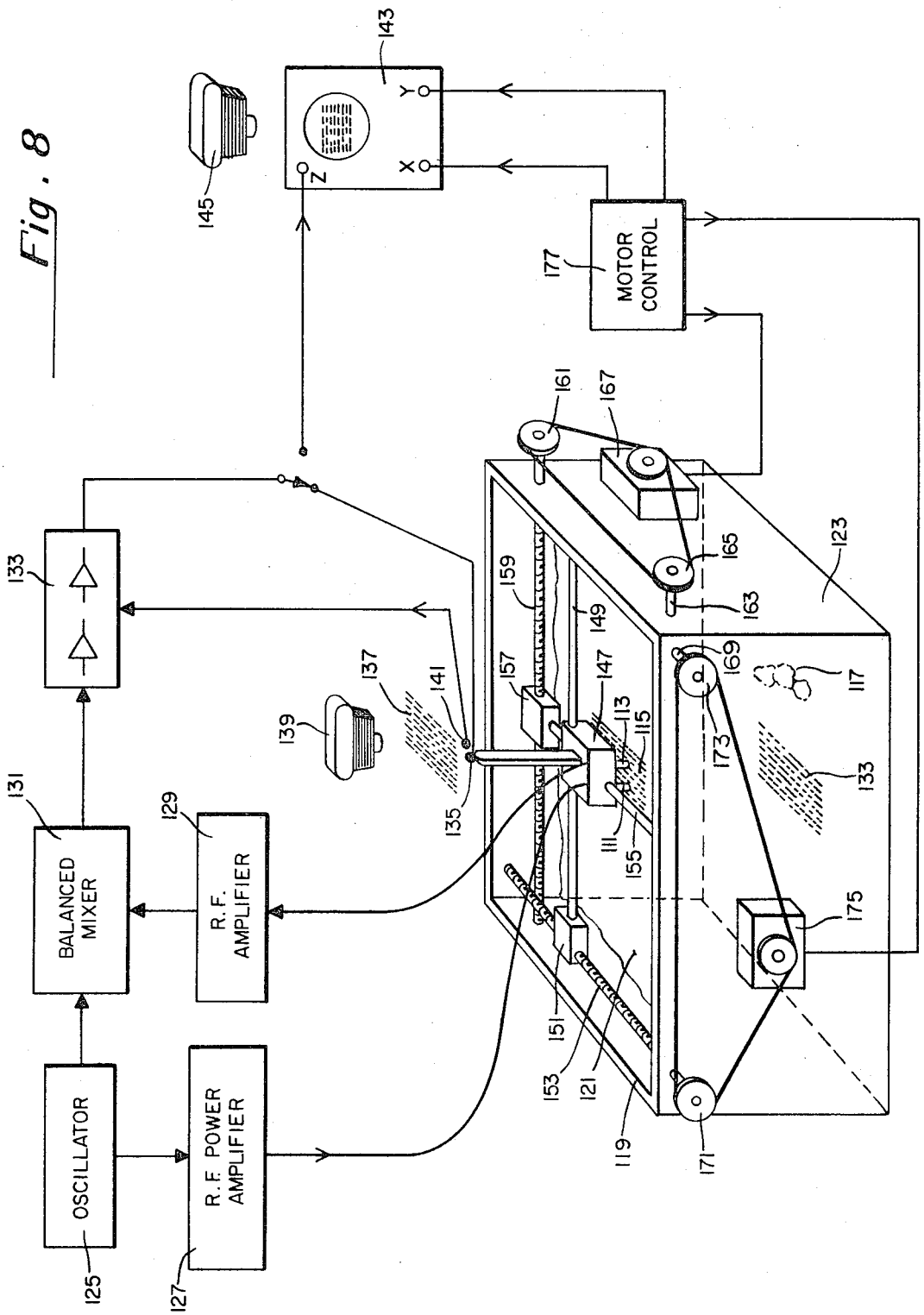
FIG. 8 shows an apparatus for practicing one embodiment of the present invention wherein the source and receiver are locked together while scanned over an area relative to an object scene.

Referring to FIG. 8, an apparatus for implementing the techniques according to one aspect of the present invention is illustrated in an embodiment of ultrasonic holography. A source transducer 111 and receiving transducer 113 are scanned across a hologram aperture area 115 to construct a hologram of an object 117. A tank 119 contains an ultrasonic-energy-transmitting medium 121 which is generally water for convenience. The bottom 123 of the tank 119 is preferably constructed of a thick slab of ultrasound-absorbing rubber to substantially prevent reflections back to the receiver 113 from anything except the object 117. The source and receiving transducers 111 and 113 are placed below the surface of the water 121 in order to avoid any reflection losses from that surface.

A mechanical system for scanning the source and receiver over a hologram aperture may be any one of many possible systems. One such system shown in FIG. 8 utilizes a positioning block 147 to which the source and receiver transducers are rigidly attached. A guide rod 149 allows the positioning block 147 to move along its length and also serves to provide motive power to the block in a direction transverse thereto. A motive block 151 is attached to one end of this rod for providing such transverse motion. The block 151 is threadedly attached to a worm drive rod 153 so that it is moved axially along the drive rod upon rotation thereof. Motion of the block 147 along the guide rod 149 is provided by a guide rod 155 which is operably connected to a motive block 157 which in turn is threadedly attached to a worm drive rod 159. As the drive rod 159 is rotated, the motive block 157 moves axially therealong and the positioning block 147 follows.

Drive rod 159 is journaled through the container 119 and has a pulley 161 attached to the end thereof. A parallel guide rod 163 (partially hidden from view) has a pulley 165 attached thereto. A chain links these two pulleys with a motor source 167 which may be of any convenient type. The guide rod 153 and a parallel guide rod 169 (partially hidden from view) have pulleys 171 and 173 attached, respectively, and joined to a motor source 175 by a chain.

This mechanical system as schematically outlined in FIG. 8 has been found to allow rapid scanning of a hologram aperture. In order to minimize the inertia of the system, the worm drive rods 153 and 159 contain small steel balls in contact between the rods and motive blocks which recirculate around the motive blocks 151 and 157 as the blocks are moved along the rod. This reduces friction of the system and provides quick response.

A motor control circuit 177 is chosen to be compatible with the motors used and is electrically connected thereto. One such control may include logic circuitry, and pulse generators designed to drive each of the motors 167 and 175 are driven independently by current pulses calculated to rotate each of the worm drive rods a fixed amount. Therefore, determining the frequency of pulses applied to each motor allows determination of the relative movement in the transverse directions.

The source and receiver transducers 111 and 113 are circular ceramic elements with a diameter of from 4 to 10 wavelengths of the ultrasound being utilized in water. The transducer element itself is preferably embedded behind a thin epoxy layer in the end of a small diameter tube. The wavelength of ultrasonic energy utilized may be chosen to depend upon the type of objects to be imaged and their reaction to ultrasound at various wavelengths. For surface characteristic rendition of reflective objects, for instance, a frequency in the neighborhood of 10 MHz. has been found to be satisfactory.

An electronic oscillator 125 generates the desired frequency for driving the source transducer 111. This oscillator can be any commercially available type within the frequency range desired and should have a relatively stable output and high degree of temperal coherence. Since an oscillator's output is generally not of sufficient amplitude to drive a transducer directly, a radiofrequency power amplifier 127 is employed to increase the amplitude of the signal.

It should be noted that an advantage of scanned ultrasonic holography in general over ordinary ultrasonic holography as disclosed in the aforementioned copending patent application Ser. No. 569,914, is that substantially less ultrasonic energy is required to construct a hologram. In ordinary ultrasonic holography, there must be sufficient energy to produce a standing wave pattern in an area detector which generally requires overcoming surface tension of a liquid.

The ultrasound reflected from the object 117 is then detected by the receiver 113 and converted into electrical signals which are amplified by a radiofrequency amplifier 129. The amplified signal provides an electric analog, in amplitude and phase, of the ultrasound field at every point in the scanned plane.

Since a reference ultrasonic beam was not used within the ultrasonic transmitting medium 121, an electrical signal must be mixed with the output signal of the amplifier 129 in order to electronically simulate an interference pattern. For this, a balanced mixer 131 combines the signal from the amplifier 129 with a reference signal from the oscillator 125. A type of phase sensitive detector is preferred for use as the balanced mixer 131 and a product detector type has been found to have many advantages. The output of the balanced mixer 131 is an electrical analogue of a hologram as if a reference beam has been directed to the surface of the ultrasonic transmitting medium 121 transversely thereto from an area 133. Note then, that the object 117 must be placed off-axis in order to construct a hologram without visual interference of unwanted background radiation. If the object 117 is desired to be placed within the area 133, then the reference beam must be made "off-axis" and this may be done by placing a phase shifter between the oscillator 125 and balance mixer 131 to operate upon the reference electrical signal.

In either case, the electrical output of the balanced mixer 131 is a signal that is nearly direct current but varies sinusoidally with the relative phase between the output signal of the amplifier 129 and the reference signal from the oscillator 125. It is this phase amplitude signal which, when recorded as transmission variations on photographic film, forms the desired hologram. However, this signal is preferably subjected to some alteration before it is used to construct a hologram on photographic film. A signal processor 133 using normal transistor operational amplifiers, amplifies this phase amplitude signal, clips some of larger transient peaks, and shifts the average amplitude of the signal to correspond with the photographic film sensitivity. The electrical signal from the signal processor 133 then drives a light source 135 which is scanned across an area 137 as a result of its mechanical connection to the positioning block 147 which scans the source and receiver transducers. Thus the light source 135 is scanned in the same pattern as that of the source 11 and receiver 113. The camera 139 will likely expose its film to a demagnified replica of the light pattern scanned across the surface 137. A camera 139 will allow exposure of its film until the full area 137 has been scanned by the light bulb. Upon development of the film, a permanent hologram is obtained capable of reconstructing an image of the object 117 as viewed by ultrasonic energy.

As a further refinement in the system which may be desired to improve the quality of the hologram, a feedback loop is provided to compensate for the nonlinearity of the light source 135. A photodiode 141 converts the intensity of the light source 135 into an electrical signal which is then fed back into the signal processor 133 so that the bulb brightness is made a linear function of the phase amplitude signal. For many applications, however, this nonlinearity correction is not necessary to obtain a hologram capable of reconstructing an image of acceptable quality.

As an alternative to using a light source directly scanning a film, an oscilloscope 143 is employed to display the hologram in a manner capable of being photographed from the oscilloscope screen by a camera 145. The phase amplitude output signal of the signal processor 133 is connected to the oscilloscope 143 to modulate the intensity of the electron beam striking the face of the tube. The electron beam must be scanned across the tube face in synchronism with scanning of the source and receiver 111 and 113 (that is, at a speed related at all times to the source and receiver speed by a proportionality constant) and may receive the $x$–$y$ scanning signal from a voltage output of the motor control 177.

By either method, after the photographic film is developed, it is illuminated with substantially monochromatic light which is diffracted by the hologram into two first order diffracted beams, each of which carries information as to the object 117. One diffracted beam will bring to focus in space an orthoscopic image of the object 117, while the other beam will bring to focus in a different position in space a pseudoscopic image of the object 117.

Although the specific system of FIG. 8 is designed for ultrasonic holography, it will be recognized that similar approaches to holography with electromagnetic radiation of various types may be taken.

Although the invention as been described in general terms with reference to simplified embodiments, it will be apparent to those skilled in the art that the underlying principle of this invention represents a broad advance in the general field of holography. Therefore, it is intended that the invention should not be limited to the specific embodiment or examples described but rather should be construed to include all such embodiments and applications as fall within the spirit and scope of the appended claims.

What is claimed is:

1. In a method of producing holographic information of an object which includes the steps of,
    illuminating the object by a diverging coherent radiation beam from a point source, thereby to produce object modified radiation,
    scanning a point receiver at a finite velocity over a surface area having a finite extent in two dimensions relative to said object to detect the object modified radiation, and
    mixing a reference signal with the object modified source radiation striking said receiver, said reference signal being mutually coherent with the object-illuminating radiation beam, thereby producing holographic information of the object;
    the improvement comprising,
        simultaneously scanning the source at a finite velocity over a surface area having a finite extent in two dimensions relative to said object.

2. A method according to claim 1 wherein the surface areas scanned are substantially plane areas.

3. A method according to claim 2 wherein the plane surface areas scanned are substantially parallel.

4. A method according to claim 2 wherein the plane surface areas scanned are substantially coincident.

5. A method according to claim 1 wherein the surface areas scanned are parallel plane areas and wherein the source and receiver are scanned over the areas with a ratio of their velocities being substantially a constant throughout the scanning process.

6. A method according to claim 1 wherein velocity components of the scanning source and receiver relative to said object are related by proportionality constants throughout the scanning process.

7. A method according to claim 6 wherein said source and receiver are scanned over substantially plane areas.

8. A method according to claim 5 wherein the constant relating the velocities of the scanning source and receiver is unity.

9. A method according to claim 1 wherein said source and said receiver are mechanically locked together throughout the simultaneous scanning.

10. A method according to claim 9 wherein the locked source and receiver are substantially coincident with each other.

11. A method according to claim 1 wherein the step of illuminating the object by a coherent radiation source includes illuminating the object by a source of electromagnetic energy.

12. A method according to claim 1 wherein the step of illuminating the object by a coherent radiation source includes illuminating the object by a source of compressional wave energy.

13. A method according to claim 1 wherein the step of illuminating the object by a coherent radiation source includes the step of illuminating the object by a source of visible light.

14. A method according to claim 1 wherein the source scanned and receiver scanned areas are nonoverlapping.

15. A method of producing and recording holographic information of an object, comprising the steps of:
    illuminating the object by scanning a point coherent radiation source at a finite velocity over a surface area of finite extent in two dimensions relative to said object, said point source illuminating substantially the same portions of the object from every point on the scanned surface area, thereby to produce object modified radiation,
    simultaneously scanning a point receiver at a finite velocity over a surface area having a finite extent in two dimensions relative to said object to detect the object modified radiation,
    mixing a reference signal with the object modified radiation striking said receiver, said reference signal being mutually coherent with the object illuminating source radiation, thereby producing holographic information of the object, and
    recording said holographic information on a two-dimensional area detector in a form so that a three-dimensional optical image of said object may be reconstructed therefrom.

16. A method of producing holographic information of an object, comprising the steps of:
    illuminating the object by scanning a point coherent radiation source in a given pattern across a first surface area of finite extent in two dimensions relative to said object, said point source illuminating substantially the same portions of the object from every point on the scanned first surface area, thereby to produce object modified radiation,
    simultaneously scanning a point receiver in a pattern that is a substantial replica of said given source scanning pattern over a second surface area of a finite extent in two dimensions relative to said object, thereby detecting the object modified radiation,
    mixing a reference signal with the object modified radiation striking said receiver, said reference signal being mutually coherent with the object illuminating source radiation, thereby producing holographic information of the object, and
    exposing to said holographic information a photosensitive surface area of a finite extent in two dimensions point-by-point thereacross in a pattern that is a substantial replica of said given source scanning pattern, whereby the holographic information produced by scanning said object is displayed in a form from which a three-dimensional image of the object may be reconstructed.

17. The method as defined in claim 16 wherein the simultaneously scanned source and receiver have velocity components in at least one direction that are related by a single proportionality constant throughout the scanning of said source and receiver surfaces.

18. The method as defined in claim 17 wherein said first and second surfaces are planes which are parallel to each other.

19. A method of producing holographic information of an object, comprising the steps of:
    illuminating the object with a diverging beam of coherent radiation from a point source, thereby generating an object modified radiation wave front,
    positioning in the path of the object modified radiation wave front a point radiation receiver which generates a signal proportional to the radiation intensity incident thereon,
    scanning the source and receiver over respective surface areas of finite extent in two dimensions relative to the object, said source and receiver at every instant traveling with respect to the object with velocities in a common direction and with a ratio of their speeds relative to the object being substantially a constant throughout the scanning of their respective areas,
    mixing a reference signal with the object modified radiation striking said receiver, said reference signal being mutually coherent with the object illuminating source radiation, thereby to produce a holographic information signal of the object,
    simultaneously exposing a photosensitive surface area of a finite extent in two dimensions to said holographic information signal, said surface being exposed point-by-point thereacross at a velocity related at all times by a proportionality constant to the receiver velocity, whereby the holographic information signal is displayed in a form from which a three-dimensional image of the object may be reconstructed.

20. The method as defined in claim 19 wherein said source and receiver scanned surface areas are planar surfaces oriented substantially parallel to each other.

21. The method as defined in claim 19 wherein said source and receiver scanned surface areas are nonoverlapping.

22. A method of producing holographic information of an object, comprising the steps of:

illuminating the object with coherent radiation from a point source, thereby to produce object modified radiation, detecting the object modified radiation with a point receiver, simultaneously scanning said point source and said point receiver in a locked relationship over surface areas of finite extent in two dimensions relative to said object, mixing a reference signal with the detected object modified radiation striking the receiver, said reference signal being mutually coherent with the object-illuminating source radiation, thereby producing holographic information of the object, and simultaneously exposing to said holographic information a photosensitive surface area of finite extent in two dimensions point-by-point thereacross in a pattern that is the same as or a substantial replica of the scanning pattern of said source and receiver relative to said object, whereby the holographic information is displayed in a form from which a three-dimensional image of the object may be reconstructed.

23. A method of producing a holographic image of an object, comprising the steps of:

illuminating the object by scanning a point coherent radiation source in a given pattern across a first surface area of finite extent in two dimensions relative to said object, said point source illuminating substantially the same portions of the object from every point on the scanned surface area, thereby to produce object modified radiation, simultaneously scanning a point receiver in a pattern that is a substantial replica of said given source scanning pattern over a second surface area of a finite extent in two dimensions relative to said object, thereby detecting the object modified radiation, mixing a reference signal with the object modified radiation striking said receiver, said reference signal being mutually coherent with the object-illuminating source radiation, thereby producing holographic information of the object, exposing to said holographic information a photosensitive surface area of finite extent in two dimensions point-by-point thereacross in a pattern that is a substantial replica of said given source scanning pattern, thereby forming a hologram, and illuminating said hologram with light radiation to reconstruct an image of said object.

24. The method as defined in claim 23 wherein the simultaneously scanned source and receiver have velocity components in at least one lateral direction that are related by a proportionality constant C at any instant throughout the scanning of said source and receiver surfaces, wherein the distances to the source and receiver scanning surfaces from the object are equal, and wherein magnifications of the object image in a radial direction ($M_r$) and in said lateral direction ($M_x$) are made substantially equal by making $M_r=M_x$ in the following expression:

$$M_r = \frac{\lambda_1}{\lambda_2} \frac{1+C^2}{(1+C)^2} M_x^2$$

where $\lambda_1$ is the wavelength of said coherent object-illuminating radiation and $\lambda_2$ is the wavelength of said hologram-illuminating light radiation.

25. A method of producing holographic information with an object submersed in a liquid medium, comprising the steps of:

illuminating the object by scanning in said liquid medium a point source of compressional wave energy in a given pattern across a first surface area of finite extent in two dimensions relative to said object, said point source illuminating substantially the same portions of the object from every point on the scanned first surface area, thereby to produce object modified radiation, simultaneously scanning in said liquid a point receiver of compressional wave energy in a pattern that is a substantial replica of said given source scanning pattern over a second surface area of a finite extent in two dimensions relative to said object, thereby detecting the object modified radiation, mixing a reference signal with the object modified radiation striking said receiver, said reference signal being mutually coherent with the object-illuminating source radiation, thereby producing holographic information of the object, and exposing to said holographic information a photosensitive surface area of a finite extent in two dimensions point-by-point thereacross in a pattern that is a substantial replica of said given source scanning pattern, whereby the holographic information produced by scanning said object is displayed in a form from which a three-dimensional optical image of the object may be reconstructed.

* * * * *